United States Patent
Amento et al.

(10) Patent No.: US 8,554,848 B2
(45) Date of Patent: Oct. 8, 2013

(54) COLLECTIVE ASYNCHRONOUS MEDIA REVIEW

(75) Inventors: Brian Amento, Morris Plains, NJ (US); Alicia Abella, Morristown, NJ (US); Eric Cheung, New York, NY (US); Kermit Hal Purdy, Bernardsville, NJ (US); Larry Stead, Upper Montclair, NJ (US)

(73) Assignee: AT&T Intellectual Property 1, L.P., Atlanta, GA (US)

( * ) Notice: Subject to any disclaimer, the term of this patent is extended or adjusted under 35 U.S.C. 154(b) by 404 days.

(21) Appl. No.: 12/386,325

(22) Filed: Apr. 16, 2009

(65) Prior Publication Data
US 2010/0287236 A1 Nov. 11, 2010

(51) Int. Cl.
*G06F 15/16* (2006.01)
(52) U.S. Cl.
USPC ............ 709/206; 709/204; 709/231; 715/751
(58) Field of Classification Search
USPC .......................... 709/206, 204, 231; 715/751
See application file for complete search history.

(56) References Cited

U.S. PATENT DOCUMENTS

| | | | |
|---|---|---|---|
| 6,917,965 B2 | 7/2005 | Gupta et al. | |
| 6,956,593 B1 | 10/2005 | Gupta et al. | |
| 8,081,860 B2 * | 12/2011 | Yoo et al. | 386/239 |
| 8,364,020 B2 * | 1/2013 | Lui | 386/278 |
| 2001/0042098 A1 * | 11/2001 | Gupta et al. | 709/206 |
| 2008/0154908 A1 * | 6/2008 | Datar et al. | 707/10 |
| 2008/0186926 A1 * | 8/2008 | Baio et al. | 370/338 |
| 2009/0164904 A1 * | 6/2009 | Horowitz et al. | 715/723 |
| 2009/0216805 A1 * | 8/2009 | Coffman et al. | 707/104.1 |
| 2009/0297118 A1 * | 12/2009 | Fink et al. | 386/52 |
| 2010/0082677 A1 * | 4/2010 | Athsani et al. | 707/783 |

* cited by examiner

*Primary Examiner* — Thuong Nguyen
(74) *Attorney, Agent, or Firm* — Guntin & Gust, PLC; Ralph Trementozzi

(57) ABSTRACT

A system and method for sharing annotations corresponding to media content among a plurality of members of a group over a communications network. The system generally includes at least one server coupled to the communications network and configured for receiving at least one annotation from a first group member corresponding to media content from the communications network; adding the at least one annotation to a database; accessing a list of members of the group, each member of the group having a user profile stored in memory; and automatically sending a notification to at least a second member of the group upon receipt of each annotation. The annotation comprises annotation content and a temporal identifier that identifies a segment of the media content to which the annotation corresponds, and the at least one server is configured for sending the annotation to at least the second group member and optionally a media stream including at least the segment of the media content with the annotation.

20 Claims, 7 Drawing Sheets

COLLECTIVE ASYNCHRONOUS MEDIA REVIEW

FIELD OF THE INVENTION

The present invention relates generally to communications networks, and more particularly, to a system and method for enabling a plurality of members of a group to create annotations corresponding to media content and automatically notify other members of the group who may view the media content asynchronously to enable collaborative commentary among the group members.

BACKGROUND OF THE INVENTION

Globally interconnected communications networks permit displaced individuals to rapidly share audio, video, documents and images. With the increasing utilization of digital video recorders and video-on-demand services, people are less likely to watch media synchronously, thereby reducing the social aspects of media viewing that were common when programming was only aired and viewed at one time. The ability to time-shift the viewing of a media stream thus presents new challenges for friends, coworkers and/or family members to discuss aspects of media that is viewed asynchronously.

Advances in computer and networking technologies have only exacerbated this problem as high-quality streaming and downloaded media playback may be performed on essentially any Network Access Device (NAD), including laptop and desktop computers, Personal Digital Assistants (PDAs) and cellular phones.

It is well-known in the art to provide synchronized media presentations to a user over a communications network. Such media refers to a plurality of media objects that share a common timeline. Audio and video are examples of such media objects, where each component is an independent data stream that is played back in a synchronized fashion on a NAD. Current media codecs such as MPEG2, MPEG4, DV, Quick-Time, H.264, 3GPP, 3GPP2 and native OS X encoding of Windows are widely deployed and have facilitated the explosion in multimedia availability in the digital age.

The term "streaming media" refers to media data that is provided over a communications network on a requested basis as opposed to media that is broadcast such as a live television event or downloaded in its entirety prior to playback. In this regard, a client executing on a network access device is able to render the streaming data as it is received from the network from a server, rather than waiting for the entire download of a media file to be completed.

In order to provide for collaborative discussion of digital media, systems and methodologies have been developed for enabling users to add temporal annotations to the content that correspond to various points in a media stream. Such temporal annotations may include textual or visual comments, gestures (i.e. thumbs up/thumbs down, smiley face, sad face and the like), audio or video clips, web links and the like. In this connection, U.S. Pat. Nos. 6,917,965 and 6,956,593, assigned to Microsoft® Corporation, disclose a client/server system and interface for creating, viewing and temporally positioning annotations for media content.

A social network service is a particular type of collaborative computing environment which focuses on building online communities of people who share interests and activities, or who are interested in exploring the interests and activities of others. Most social network services are web based and provide a variety of ways for users to interact, such as e-mail and instant messaging services and others. Examples of popular North American social networking services are MySpace™ and Facebook®.

Users of a social networking service can chose to interact synchronously, that is to communicate or chat one-on-one or in a specific user group utilizing Instant Messaging (IM), a traditional telephone call, a cellular phone call, email, Short Message Service (SMS), Multimedia Messaging Service (MMS) or other messaging standard(s), share favorite links or other acquaintances ("Friends") in real or near-real time, or interact asynchronously, that is, not in real-time.

It would therefore be advantageous to provide a system and methodology that provides a "social" collaborative experience for asynchronous media review between members of a group. The group can be registered in a networked environment, and as members thereof create annotations corresponding to media content, other members of the group are automatically notified of the commentary and presented with a plurality of options, such as viewing the annotations, adding additional annotations, responding directly to the previously created annotations, and the like. In this manner, group members who create annotations are always automatically notified of annotations that are subsequently added by the other group members.

SUMMARY OF THE INVENTION

In accordance with aspects of the present invention, there is provided a method for sharing annotations corresponding to media content among a plurality of members of a group over a communications network, comprising: receiving at least one annotation from a first group member corresponding to media content from the communications network; adding the at least one annotation to a database; accessing a list of members of the group, each member of the group having a user profile stored in memory; and automatically sending a notification to at least a second member of the group in accordance with preferences contained in the user profiles of the group members.

The annotation comprises annotation content and a temporal identifier that identifies a segment of the media content to which the annotation corresponds, and the notification comprises sending the annotation to at least the second group member.

Alternatively, the annotation comprises annotation content and a temporal identifier that identifies a segment of the media content to which the annotation corresponds, and the notification comprises sending the annotation to at least the second group member and a media stream including at least the segment of the media content with the annotation.

The at least the segment of the media content may be defined by a number of frames of the media content disposed around a plurality of annotations created by members of the group.

The notification may be made via email, SMS, EMS, MMS or the like. Upon receiving the notification, the group member has the option to either respond over the communication channel on which they were contacted and add a new annotation temporally to the media content, visit a web page showing all annotations and attaching a new annotation through a web interface, or log onto the system and jump to a spot in the media to join a "discussion" of the media in real time.

In accordance with another aspect of the invention, there is provided at least one machine-readable medium having machine-readable instructions encoded thereon which, when executed by a processor, cause at least one server in a communications network to enable sharing annotations corresponding to media content among a plurality of members of a group by: receiving at least one annotation from a first group member corresponding to media content from a communications network; adding the at least one annotation to a database; accessing a list of members of the group, each member of the group having a user profile stored in memory; and sending a notification to at least a second member of the group in accordance with preferences contained in the user profiles of the group members.

In accordance with yet another aspect of the invention, there is provided a system for sharing annotations corresponding to media content among a plurality of members of a group over a communications network, comprising: at least one server coupled to the communications network and configured for receiving at least one annotation from a first group member corresponding to media content from the communications network; adding the at least one annotation to a database; accessing a list of members of the group, each member of the group having a user profile stored in memory; and sending a notification to at least a second member of the group in accordance with preferences contained in the user profiles of the group members. The annotation comprises annotation content and a temporal identifier that identifies a segment of the media content to which the annotation corresponds, and the at least one server is configured for sending the annotation to at least the second group member and optionally a media stream including at least the segment of the media content with the annotation.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
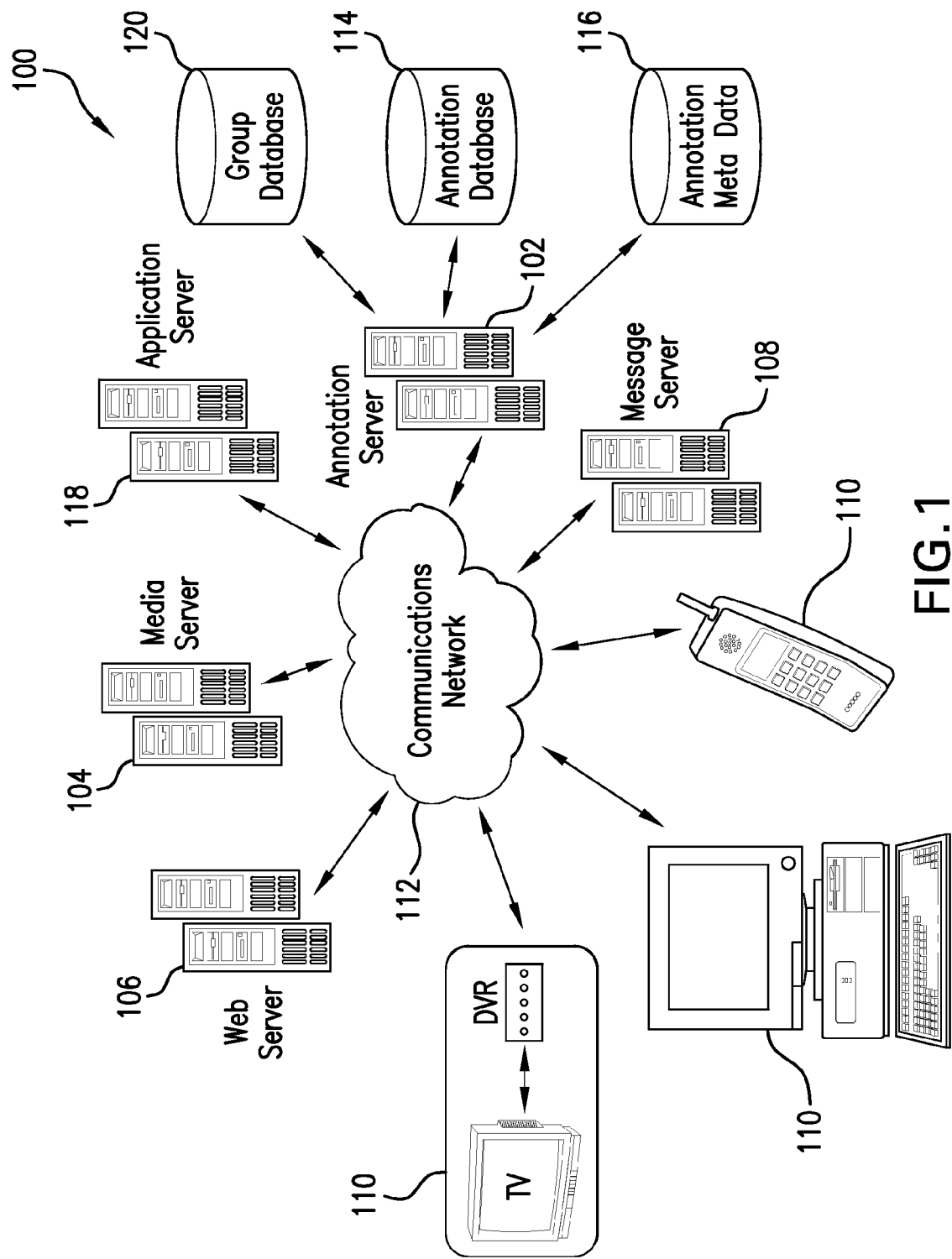
FIG. 1 is a schematic of an exemplary environment for creating, viewing and temporally positioning annotations corresponding to media content.

FIG. 1 is a schematic of an exemplary environment 100 for creating, viewing and temporally positioning annotations into media content. The system is depicted as a client/server architecture and generally comprises an annotation server 102, media server 104, web server 106 and messaging server 108, application server 118, and a plurality of network access devices 110 (e.g., PDA, desktop computer and digital TV coupled to a Digital Video Recorder (DVR)). The network access devices 110 communicate with other network access devices (not shown) over a communications network 112. The communications network 112 may comprise a plurality of interconnected wide-area networks, local-area networks and/or private wide-area networks. Exemplary packet networks include Internet protocol (IP) networks, Asynchronous Transfer Mode (ATM) networks, frame-relay networks, and the like. An IP network is broadly defined as a network that uses an Internet Protocol, such as IPv4 or IPv6 and or any hereinafter developed protocol, to exchange data packets.

The network access devices 110 may comprise personal computers, laptop computers, Personal Digital Assistants (PDAs), cellular telephones, Internet Protocol TVs (IPTVs), Digital Video Recorders (DVRs) and the like. The network access devices 110 communicate with a core network through various access networks (not shown), such as a Digital Subscriber Line (DSL) network, a broadband cable access network, a Local Area Network (LAN), a Wireless Access Network (WAN), a cellular network, etc. The above IP network is described to provide an illustrative environment in which packets for voice and data services are transmitted on networks.

Media server 104 has access to media content in the form of different media streams. Media streams may be in the form of stored files in a database or other file storage system, such as a movie, or supplied to the server on a "live" basis, such as a sporting event.

There are various standards for streaming media content and composite media streams. Advanced Streaming Format (ASF) by Microsoft® is an example of one such a standard. ASF specifies the way in which multimedia content is stored, streamed, and presented by the tools, servers, and clients of various multimedia vendors.

Annotation server 102 is configured to store and provision annotations that are received and communicated to the network access devices 110. In an exemplary embodiment, the annotation server 102 manages annotation meta data 116 and an annotation database 114 as known in the art. The annotation server 102 communicates with the network access devices 110 via any of a wide variety of known packet protocols, such as, for example, the Hypertext Transfer Protocol (HTTP). The annotation server 102 can receive and send annotations through a direct link with a network access device 110, or alternatively, via messaging server 108. The message server 108 is configured to communicate with the network access devices 110 via email, Short Message Service (SMS), Enhanced Message Service (EMS), Multimedia Message Service (MMS) and the like, as will be explained in more detail below. Although shown as a "single server" 108, it will be appreciated that server 108 may comprise a plurality of servers that implement respective email and/or messaging functionality. The annotation server 102 communicates with the message server 108 via known protocols, such as the Simple Mail Transfer Protocol (SMTP) for email, or other instant messaging protocols such as MMS Protocol, XMPP, SIMPLE and the like. The annotation server 102 also communicates with a group database 120 that stores user/subscriber profiles in accordance with an aspect of the invention as described in further detail below.

The annotation server 102 receives and sends annotations corresponding to media content, which may be streaming media stored on and accessed from media server 104, or media stored on any other server or the network access devices 110 themselves. The annotations are created by users on the network access devices 110 and uploaded through the communications network 112 to the annotation server 102.

A user on a network access device 110 can access streaming media via a web link through a conventional web browser as is well known in the art. In an exemplary application, the network access device establishes a connection to web server 106 for a Hyper Text Markup Language HTML page and a request to media server 104 for streaming media stored on media server 104. Alternatively, the network access device 110 is able to display locally stored media, i.e., data stored on magnetic or optical media coupled to or otherwise associated with the network access device. Using a Graphical User Interface (GUI) on the network access device 110, the user can add annotations having temporal markers that correspond to the media and upload those annotations to annotation server 102. These stored annotations can be subsequently merged with the media for playback on any of the network access devices 110 running a client program adapted for providing such functionality as known in the art.

Figure 2:
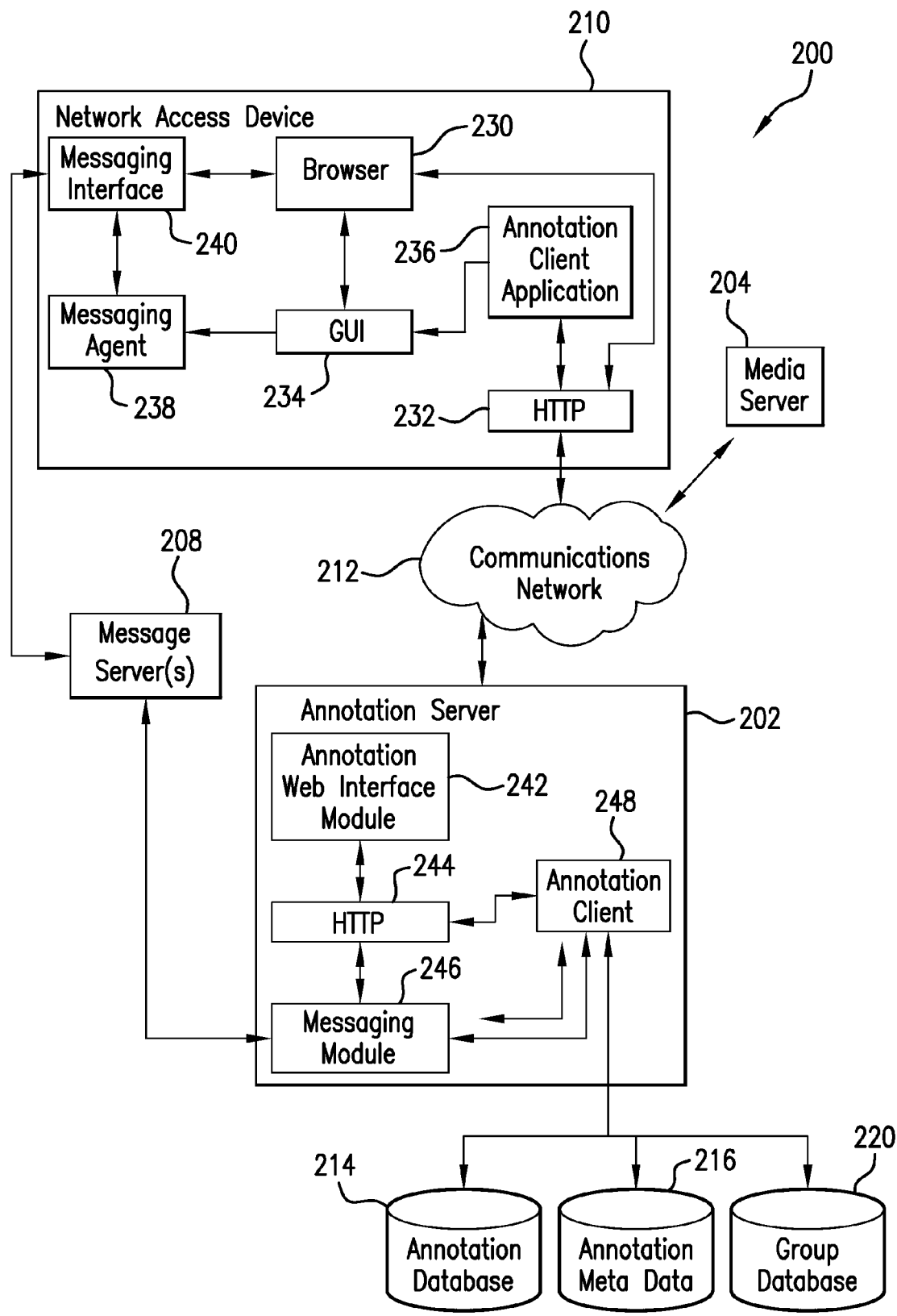
FIG. 2 is a block diagram showing an exemplary client/server architecture for implementing aspects of the present invention.

FIG. 2 is a block diagram showing more details of an exemplary client/server architecture 200 for implementing aspects of the invention. Network access device 210 comprises a typical browser 230 coupled to an HTTP module 232 for generating and receiving HTTP requests to communicate with the annotation server 202. The browser 230 is linked to a GUI 234 which provides a user with an interface to select and view media on the network access device in a typical fashion. The GUI additionally permits the user to view annotated media content and to add new annotations to media content that are transmitted to the annotation server 202 via an annotation client application 236. The client application 236 is also operable to merge annotations with media received from media server 204 or media resident on the network access device 210 or associated magnetic or optical storage (not shown). The network access device 210 further includes a messaging agent 238 and messaging interface 240. The messaging agent 238 may be configured to provide various forms of communication including but not limited to email, SMS, EMS, and MMS. The messaging agent 238 provides for the generation, transmission, receipt and storage of messages at the network access device 210. The messaging interface 240 enables a user to create and receive messages using the network access device as is well known. The messaging interface is adapted for receiving communications from the annotation server 202 or from a separate communication server(s) 208 containing annotations that are created by other users of the system that have uploaded annotations to the annotation server 202.

The annotation server 202 comprises an annotation web interface module 242 for implementing the web server functionality of the annotation server 202. This may include an Internet Services Application Programming Interface plug-in for an Internet Information Server Module of the type known in the art of server design. The annotation server 202 further includes an HTTP module 244 for managing networked communications with the network access devices 210. A messaging module 246 is coupled to the HTTP module 244 to enable communication with an external messaging server(s) 208 that provides email, SMS, EMS, MMS or like functionality. The annotation server further comprises an annotation client 248 that is programmed to provide the functionality of the annotation server 202, including storing and retrieving annotations to and from annotation database 214 and storing received meta data corresponding to annotation content in database 216. The annotation client 248 is further configured to access a group database 220 that stores user profiles of members of defined viewing groups as described in more detail below. The annotation client 248 is adapted to cooperate with messaging 246 to automatically send notifications to group members in accordance with user profiles stored in database 220.

The annotation content and meta data storage is implemented using known methods, such as through SQL relational databases. The storage is shown in the drawings as being split into a plurality of databases, although it will be appreciated by those skilled in the art that this data may be part of a single storage system or even disposed at another location on the communications network 212.

Figure 3:
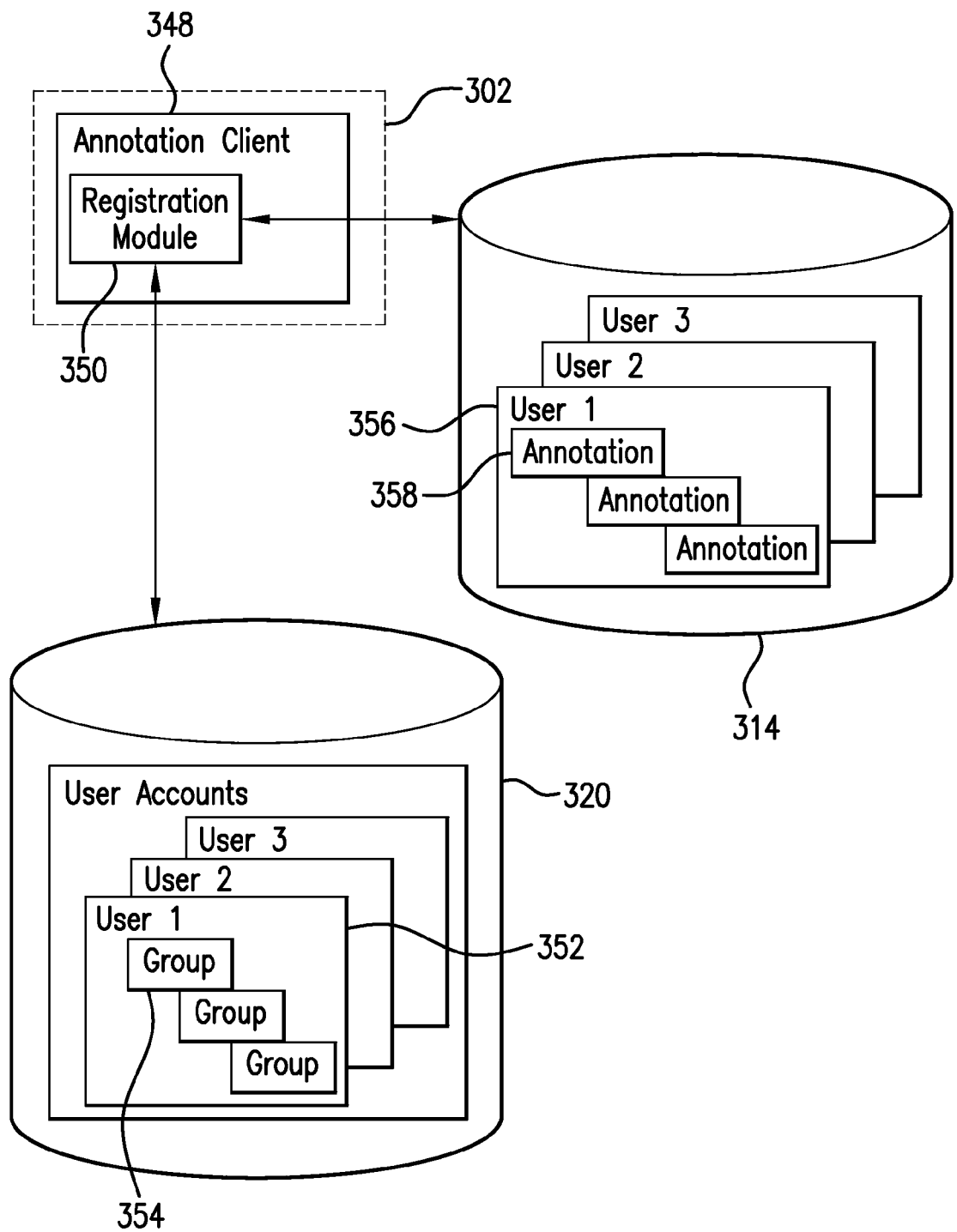
FIG. 3 is a schematic showing an aspect of the annotation client that resides on the annotation server for implementing aspects of the present invention.

FIG. 3 is a schematic showing an aspect of the annotation client 348 that resides on the annotation server 302 (corresponding to 202 in FIG. 2). The annotation client 348 includes a registration module 350 for registering the members of a collaborative viewing group, setting up user accounts for the members, and managing the accounts. These members may be directed through a user registration procedure, including obtaining a username/password and setting up an account with user preferences stored in a profile for creating, receiving and sending annotations/annotated media content. If charges are to be incurred for providing the service, a connection may be established between the annotation server 302 and a third-party billing server in a manner known in the art (not shown). Each user 352 in the group database 320 may be part of one or more collaborative viewing groups identified by the reference numeral 354. Groups may be established by any of a variety of criteria, including but not limited to, friends, family, coworkers, common interests and the like. The users' annotations are stored in the annotation database 314 (corresponding to 214, FIG. 2) and may be structured in a variety of different ways. In the illustrative embodiment, each user 356 has an associated list of annotations 358 associated therewith. These annotations may be structured and logically linked in many different ways as will be appreciated by those skilled in the art.

Figure 4:
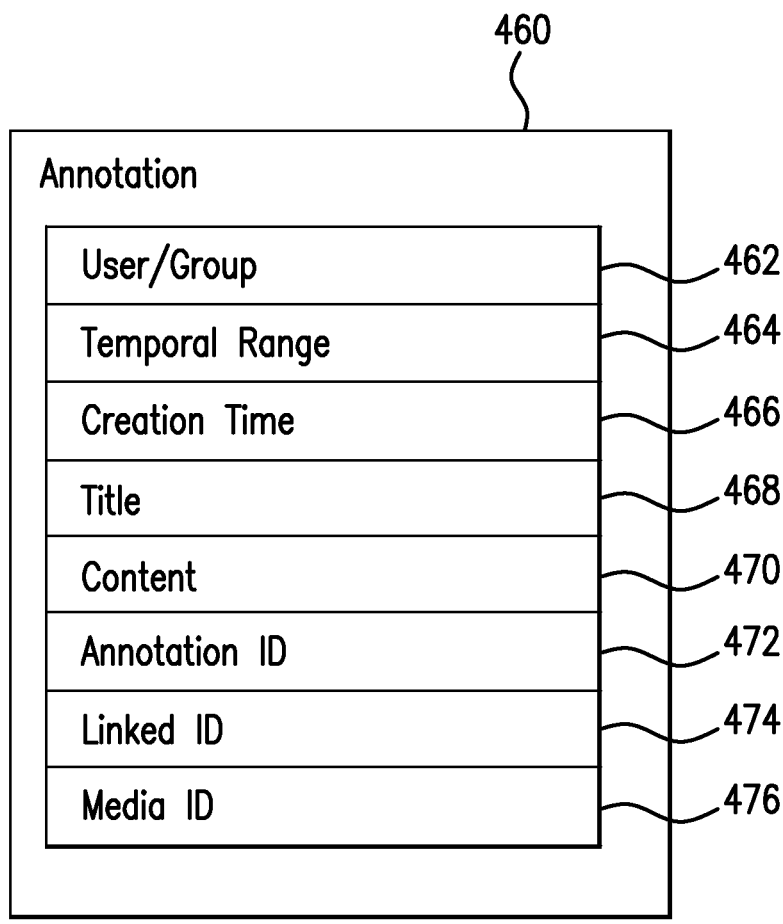
FIG. 4 shows an exemplary annotation entry in accordance with an aspect of the present invention.

An exemplary annotation entry is shown in FIG. 4, which is generally comprised of several data fields including a user/group field 462, temporal range field 464, creation time field 466, title field 468, content field 470, annotation ID 472, link ID 474 and media ID 476. The term "field" is intended to be merely exemplary as many different types of data structures may be employed to organize and relate the stored data. In the example shown, the user/group field 462 contains data identifying the user who made the annotation and optionally the collaborative viewing group information, i.e., a list of other members of the viewing group who are interested in viewing the annotation. The temporal range field 464 contains data representing temporal markers corresponding to the media content to which the annotation pertains as identified by the media ID field 476. The time the annotation is created is contained in the creation time field 466 and the annotation may be provided with a title by the creator in field 468. The content of the annotation is stored in field 470, and represents the actual type of annotation that was authored by the creator and includes text (e.g., alphanumeric characters and/or symbols), audio (e.g., a recorded audio file), video (e.g., recorded gestures or reactions as captured by a video recording device), avatars and the like. The media ID 476 may be used to identify different media versions of identical media content. The data may represent a real-time transport protocol (RTP) address of different media streams as taught by the Microsoft '965 Patent discussed above. Alternatively, identifiers may be assigned to the content instead of the individual media streams, or a unique identifier of the media streams can be created by the annotation server 202 and assigned to the media streams as disclosed in the Microsoft® '965 Patent. The practice of generating, managing and communicating annotations for media content from a networked server is generally known in the art and thus more details thereof are not discussed further herein.

Users of the system may select their preferences for receiving annotations from other users in a viewing group, including the quantitative and/or qualitative level of messaging (i.e. to/from specific users in a group, all users, or annotations only regarding specific content and/or those directed to be communicated to/from a particular network access device. For example, a user may only wish to receive annotation notifications on his or her PDA but not on a personal computer or laptop computer. These preferences may be implemented through messaging preferences that are set up by the registration module 350 shown in FIG. 3.

Figure 5:
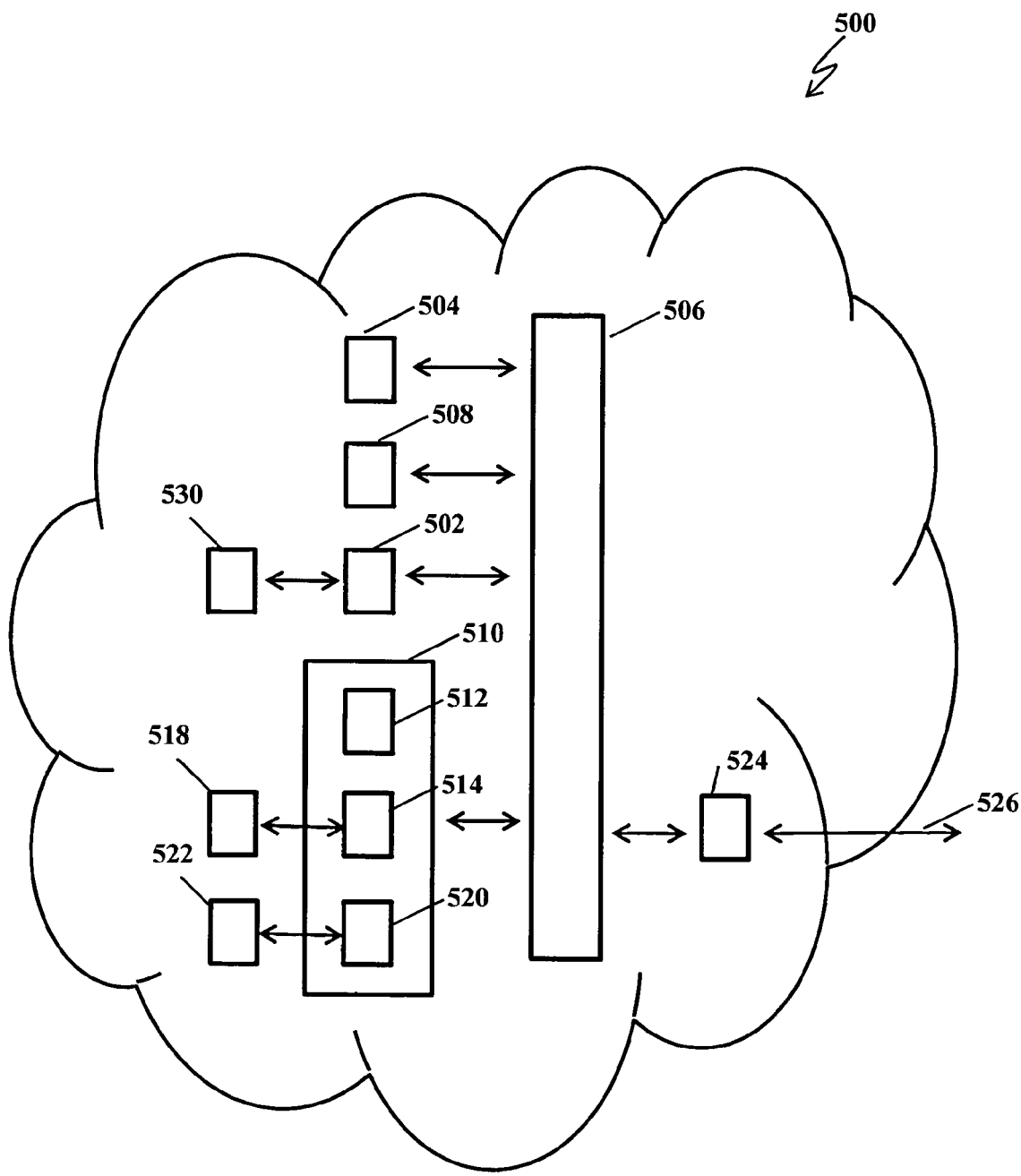
FIG. 5 is a schematic of an exemplary computer system that can be used as a network access device or a server to implement the functionality of the present invention.

The present invention may be implemented using hardware, software or a combination thereof and may be implemented in one or more computer systems or other processing systems. FIG. 5 is a schematic of an exemplary computer system 500 that can be used as a network access device or a server to implement the functionality of the present invention. It will be appreciated by those skilled in the art that computer system 500 may operate as a server that is networked to other computers (network access devices) to operate as a client/server system, as known by those skilled in the art, or computer 500 may operate as a standalone system. Computer system 500 includes one or more processors, such as processor 504. Processor 504 is connected to a communication infrastructure 506 (e.g., a communications bus, cross-over bar, or network). Computer system 500 can include a display interface 502 (e.g. a graphics card) that allows graphics, text, and other data from the communication infrastructure 506 (or from a frame buffer not shown) to be displayed on a display unit 530. Computer system 500 also includes a main memory 508, preferably random access memory (RAM), and may also include a secondary memory 510. The secondary memory 510 may include, for example, a hard disk drive 512 and/or a removable storage drive 514. The removable storage drive 514 has read/write functionality onto removable storage media 518 having stored therein computer software and/or data. In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500. Computer system 500 may also include a communications interface 524 allowing software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals (not shown), which may be electronic, electromagnetic, optical or other signals capable of being received by communications interface 524. These signals are provided to communications interface 524 via a communications path (e.g., channel) 526. This path 526 carries the signals and may be implemented using wire or cable, fiber optics, a telephone line, a cellular link, a radio frequency (RF) link and/or other communications channels. Computer programs (also referred to as computer control logic) are stored in main memory 508 and/or secondary memory 510. Computer programs may also be received via communications interface 524. Computer programs, when executed, enable the computer system 500 to perform the features of the present invention, as discussed herein. Accordingly, such computer programs represent controllers of the computer system 500. In an embodiment where the invention is implemented using software, the software may be stored in a computer program product and loaded into computer system 500 using removable storage drive 514, hard drive 512, or communications interface 524. The control logic (software), when executed by the processor 504, causes the processor 504 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present invention may be implemented, for example, as a Microsoft.net® desktop application program (Microsoft.net® is made by Microsoft® Corporation of Redmond, Wash.), which may reside on a computer hard drive, database or other repository of data, or be uploaded from the Internet or other network (e.g., from a PC, minicomputer, mainframe computer, microcomputer, telephone device, PDA, or other network access device having a processor and input and/or output capability). Any available software tool capable of implementing the concepts described herein may be used to implement the system and method of the present invention. The method and system of the present invention may also be implemented as an application-specific add-on to a program, or as a standalone application.

Figure 6:
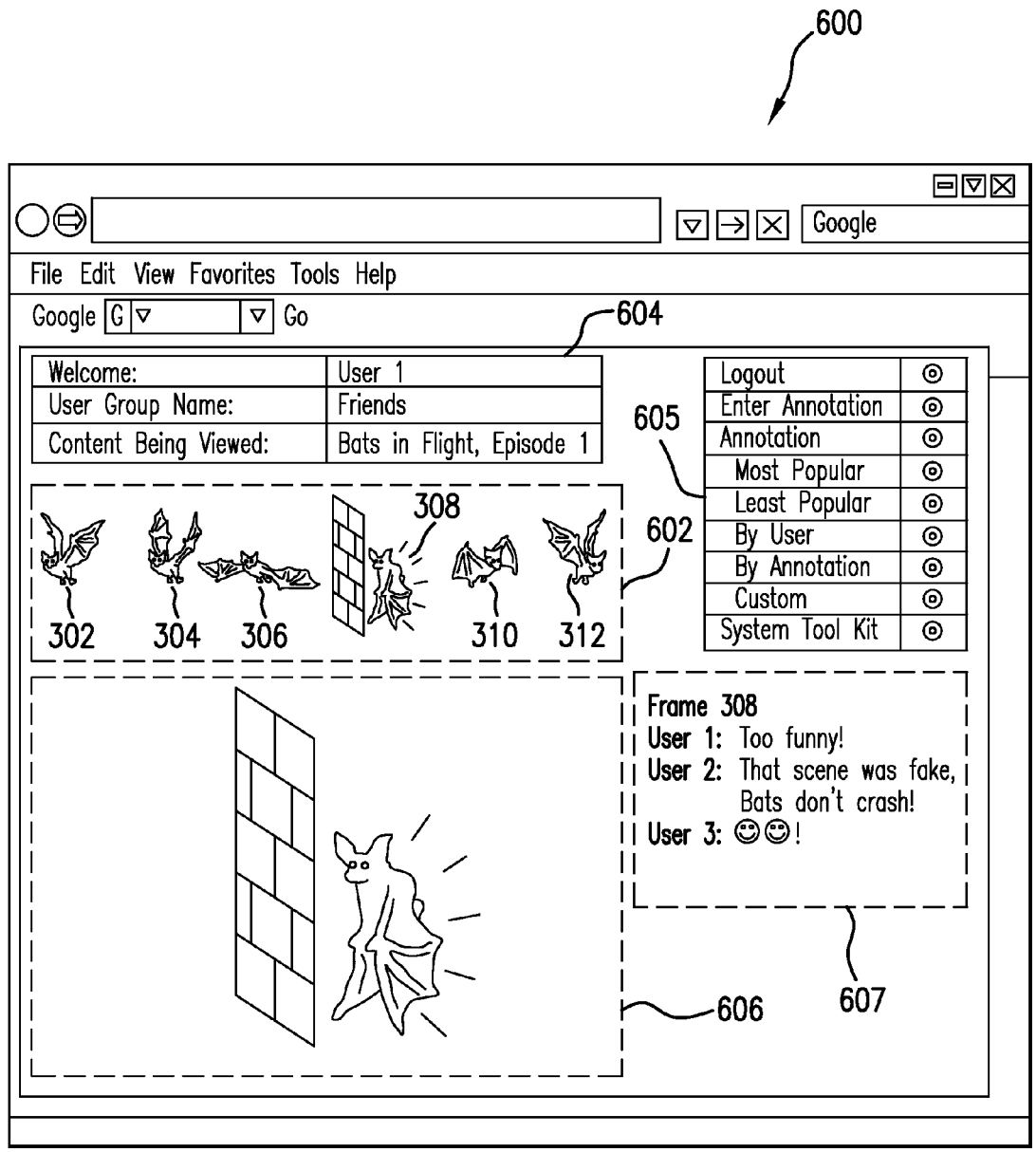
FIG. 6 is schematic of an exemplary GUI on a network access device for viewing adding and receiving annotations corresponding to a media stream.

Referring now to FIG. 6, there is depicted an exemplary GUI 600 on a network access device for viewing an exemplary media stream. The GUI 600 includes dialog boxes and Uniform Resource Locators (URLs) for entering information and a viewer(s) for playing media content. In the example shown, a dialog box 604 identifies the user (author/viewer), group name (e.g., "friends" in the collaborative viewing environment), and an episode of media content being viewed (e.g., "Bats in Flight, Episode 1"). Box 605 may contain a plurality of selectable menu items that may be linked in a hierarchal manner to implement various functions on the GUI, the details of which are not relevant here. The user may enter temporal annotations corresponding to the media that are communicated via a communications network and stored on an annotation server as described above. Here, User 1 makes the comment "Too funny!" with respect to frames 302-308 of the media stream in dialog box 607. Alternatively, the user may make a comment with respect to a single frame 308 as shown in media playback box 606. The annotation is stored in annotation server, and in this example, a notification message is automatically communicated to User 2 and User 3 of the group "friends." These users are provided with a notification based on their preferences stored in their associated user profiles on the annotation server as discussed above. The annotation server automatically sends a message to User 2 and User 3 containing the annotation created by User 1. In one embodiment, the annotation is accompanied by a media stream containing a segment of the media around the temporal markers included with the annotation. That is, the media stream that is provided to Users 2 and 3 may range from a single frame (606) or a plurality of frames (302-312) around an area of interest. User's 2 and 3 may not be watching the media synchronously and thus when they are notified of the existence of the annotation corresponding to the media content that was entered by User 1, they can join in a real-time discussion and add their own annotations, or can decide to respond at a time of their own choosing. The client application running on the network access device is configured for enabling an on-line discussion via a web interface as is well known in the art. In this manner, once notified, group members (users) can choose to participate in a real-time discussion of the media by adding their own annotations in response to prior comments by other group members regarding a particular segment of the media content or by creating new annotations to other segments of the media content. As subsequent annotations are made by Users 2, 3 and so on, they are added to the annotation database, thereby constantly updating the annotations corresponding to a selected media presentation for subsequent playback and review. As discussed above, the notification may be made using a variety of methods and in accordance with the individual user preferences. Moreover, User 1 may be viewing a selected portion of media content for comment from a DVR, while Users 2 and 3 may be notified and provided with the annotations and relevant segments of the media content on their respective PDAs. In all events, notification to each user is transparent and accomplished automatically by the annotation server upon receipt of each annotation. As more and more users of a group comment on the media, their respective annotations are added to the conversation thread and a "centroid" of interest may be established to provide a targeted search area in the media stream for other users to select the most commented on area of interest.

Another aspect of the present invention enables a user to define the amount of video content to be presented, for example 1 second, 10 seconds or 2 minutes, around the most heavily annotated area or centroid of annotations. For example, a user may only desire to go directly to the most popular (most annotated) frame(s) of selected media content and view a certain temporal segment of video. In the example shown, a user would be directed to Frame 308 plus and/or minus 15 seconds. Alternatively, the system can determine the amount of video content to be displayed, determined in part by the amount of annotations. For example, a default may be 1 minute of content around the centroid, and correspondingly less content around correspondingly less popular (less annotated) areas. Furthermore, individual frame shots, not video content, can be selected for display. This is illustrated in FIG. 6 in box 606.

Figure 7:
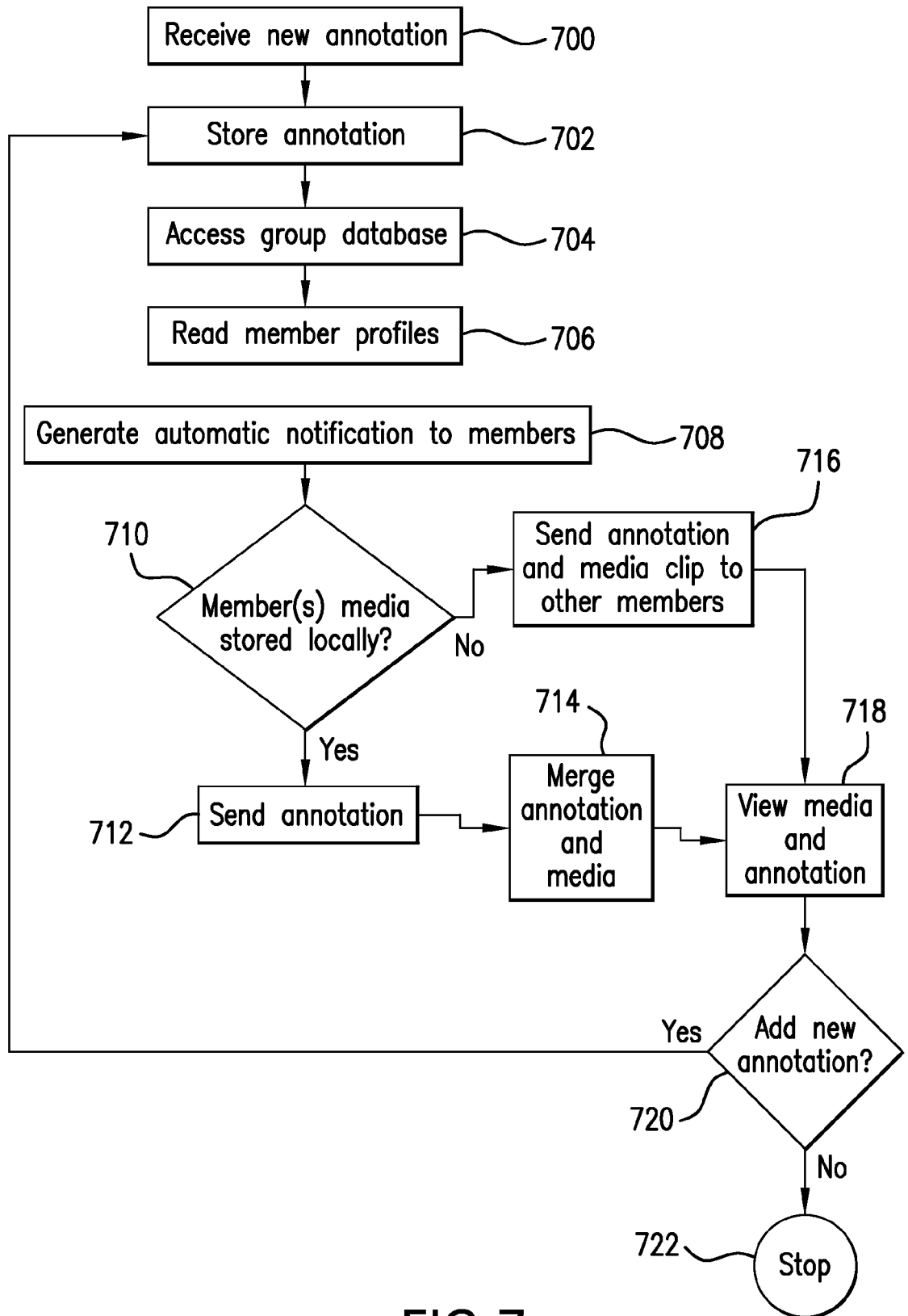
FIG. 7 is a flowchart of an exemplary method in accordance with an aspect of the present invention.

FIG. 7 is a flowchart of an exemplary method in accordance with an aspect of the invention. In step 700, the annotation server receives a new annotation from a member of a collaborative viewing group corresponding to media content from a communications network. In step 702, the annotation server adds the annotation to a database. In step 704, the annotation server accesses a list of members of the group in a group database. As described in the foregoing, each member of the group has registered a user profile and accompanying preferences. At step 706, the annotation server checks the member profiles within the group that has been associated with the incoming annotation and then generates and sends a notification to at least a second member of the group at step 708. If the recipient(s) has the media stored locally (i.e., on a DVR or computer memory) at step 710, then at step 712 the annotation server sends only the annotation to the target member(s). Then at step 714 the annotation is merged locally with the media at the user site on the respective network access device that was used to receive the notification. However, if the member does not have the media stored locally, then at 716 the annotation server sends the annotation and a clip containing a segment of the media around the annotation to the targeted member(s). The recipient then views the annotation and media segment at 718 and is provided with the option to comment by means of adding a new annotation (step 720) or exiting (step 722). If the recipient(s) chooses to add a new annotation(s), then the process loops back to step 702 and the process repeats as more annotations are added to the database, with each addition resulting in an automatic notification to the members of the collaborative viewing group. Upon receiving a notification, the recipient has the option to either respond over the communication channel on which they were contacted and add a new annotation temporally to the media content, visit a web page showing all annotations and add a new annotation through a web interface, or log onto the system and jump to a spot in the media to join a "discussion" in real time.

In summary, the present invention facilitates a collaborative computing environment where multimedia content can be consumed asynchronously, with users annotating content, which becomes the content to be presented to subsequent users. Additionally, the annotations can themselves searched utilizing search criteria such as most popular (most annotated), least popular, by user, and by the text of the annotation. Some of the benefits of the present invention are enabling collective awareness to let others know a user has watched multimedia content, providing a user presence in a group, providing a means of determining what content is being consumed and collectively preferred, enabling synchronous and asynchronous consumption of the multimedia content, discussion stimulus and alerting others to interest areas and annotations added to already viewed (consumed) content.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method, comprising:
    receiving, by a system comprising a processor, an annotation from a first communication device of a first member of a group, wherein the annotation corresponds to media content, wherein the annotation is received over a communications network;
    adding, by the system, the annotation to a database;
    accessing, by the system, a list of members of the group, each member of the group having a user profile stored in memory;
    selecting, by the system, in response to the receiving of the annotation from the first communication device of the first member of the group, a media segment from the media content that corresponds to the annotation, wherein the media content includes the media segment, wherein a length of the media segment is determined by the system, without receiving input from a user, based on a default content length that is adjusted based on a number of annotations made by the group that corresponds to the media segment, the length of the media segment being increased based on an increase in other annotations provided by other members of the group, wherein each of the annotations is within the default content length; and sending, by the system, in response to the receiving of the annotation from the first communication device of the first member of the group and a preference stored in the user profile of a second member of the group, a notification to a second communication device of the second member of the group, wherein the notification comprises the annotation and a media stream comprising the media segment of the media content to which the annotation corresponds.

2. The method according to claim 1, further comprising determining, by the system, a point of interest in the media content based on the annotations made by the group for the media content, wherein the length of the media segment comprises the point of interest in the media segment.

3. The method according to claim 1, wherein the length of the media segment is determined by the system using one of audio processing techniques, video processing techniques, or combinations thereof.

4. The method according to claim 3, wherein the media segment is defined by a number of frames of the media content disposed around a plurality of annotations created by members of the group.

5. The method according to claim 1, wherein the second member of the group is selected by the system in part based on the user profiles in the memory.

6. The method according to claim 1, wherein the notification is sent by instant message.

7. The method according to claim 1, wherein the notification is sent by short message service.

8. The method according to claim 1, wherein the notification is sent by enterprise messaging system.

9. The method according to claim 1, wherein the notification is sent by multimedia messaging system.

10. The method according to claim 1, further comprising receiving, by the system, a second annotation from the second member of the group in response to the annotation from the first member of the group and generating another notification to the first and second members of the group.

11. A non-transitory machine-readable storage medium, comprising instructions, wherein execution of the instructions causes a processor to perform operations comprising:

causing a server in a communications network to enable sharing annotations corresponding to media content among a plurality of members of a group by:

receiving over the communications network an annotation from a first communication device of a first member of a group, wherein the annotation corresponds to media content;

adding the annotation to a database;

accessing a list of members of the group, each member of the group having a user profile stored in memory;

determining a point of interest in the media content based on annotations generated by the group for the media content;

selecting, in response to the receiving of the annotation from the first communication device of the first member of the group, a media segment from the media content that corresponds to the annotation, wherein the media content includes the media segment, wherein a length of the media segment is determined by the server, without receiving input from a user, based on a default content length that is adjusted based on a number of annotations made by the group that corresponds to the media segment, the length of the media segment being increased based on an increase in other annotations provided by other members of the group, wherein the length of the media segment comprises the point of interest in the media segment, wherein each of the annotations is within the default content length; and sending, in response to the receiving of the annotation from the first communication device of the first member of the group and a preference stored in the user profile of a second member of the group, a notification to a second communication device of the second member of the group, wherein the notification comprises the annotation and a media stream comprising the media segment of the media content to which the annotation corresponds.

12. The non-transitory machine-readable storage medium according to claim 11, wherein the length of the media segment is determined using one of audio processing techniques, video processing techniques, or combinations thereof.

13. The non-transitory machine-readable storage medium according to claim 11, wherein the notification is sent using one of an instant message, a short message service, an enterprise messaging system or a multimedia messaging system without using an email.

14. The non-transitory machine-readable storage medium according to claim 11, further comprising generating the notification via email to the second member of the group.

15. The non-transitory machine-readable storage medium according to claim 11, further comprising generating the notification via instant message to the second member of the group.

16. The non-transitory machine-readable storage medium according to claim 11, further comprising generating the notification via short message service to the second member of the group.

17. The non-transitory machine-readable storage medium according to claim 11, further comprising generating the notification via enterprise messaging system to the second member of the group.

18. The non-transitory machine-readable storage medium according to claim 11, further comprising generating the notification via multimedia messaging system to the second member of the group.

19. A server, comprising:

a memory to store instructions; and a processor coupled with the memory, wherein the processor, responsive to executing the instructions, performs operations comprising:

receiving over a communications network, an annotation from a communication device of a first member of a group, wherein the annotation corresponds to media content;

adding the annotation to a database;

accessing a list of members of the group, each member of the group having a user profile stored in memory;

selecting, in response to the receiving of the annotation from the communication device of the first member of the group, a media segment from the media content that corresponds to the annotation, wherein the media content includes the media segment, wherein a length of the media segment is determined by the server, without receiving input from a user, based on a default content length that is adjusted based on a number of annotations made by the group that corresponds to the media segment, the length of the media segment being increased based on an increase in other annotations provided by other members of the group, wherein each of the annotations is within the default content length; and sending, in response to the receiving of the annotation from the communication device of the first member of the group and a preference stored in the user profile of a second member of the group, a notification to a second communication device of the second member of the group, wherein the notification comprises the annotation and a media stream comprising the media segment of the media content to which the annotation corresponds.

20. The server according to claim 19, wherein the processor, responsive to executing the instructions, further performs operations comprising determining a point of interest in the media content based on the annotations made by the group for the media content, and wherein the length of the media segment comprises the point of interest in the media segment.

* * * * *